United States Patent Office 3,062,656
Patented Nov. 6, 1962

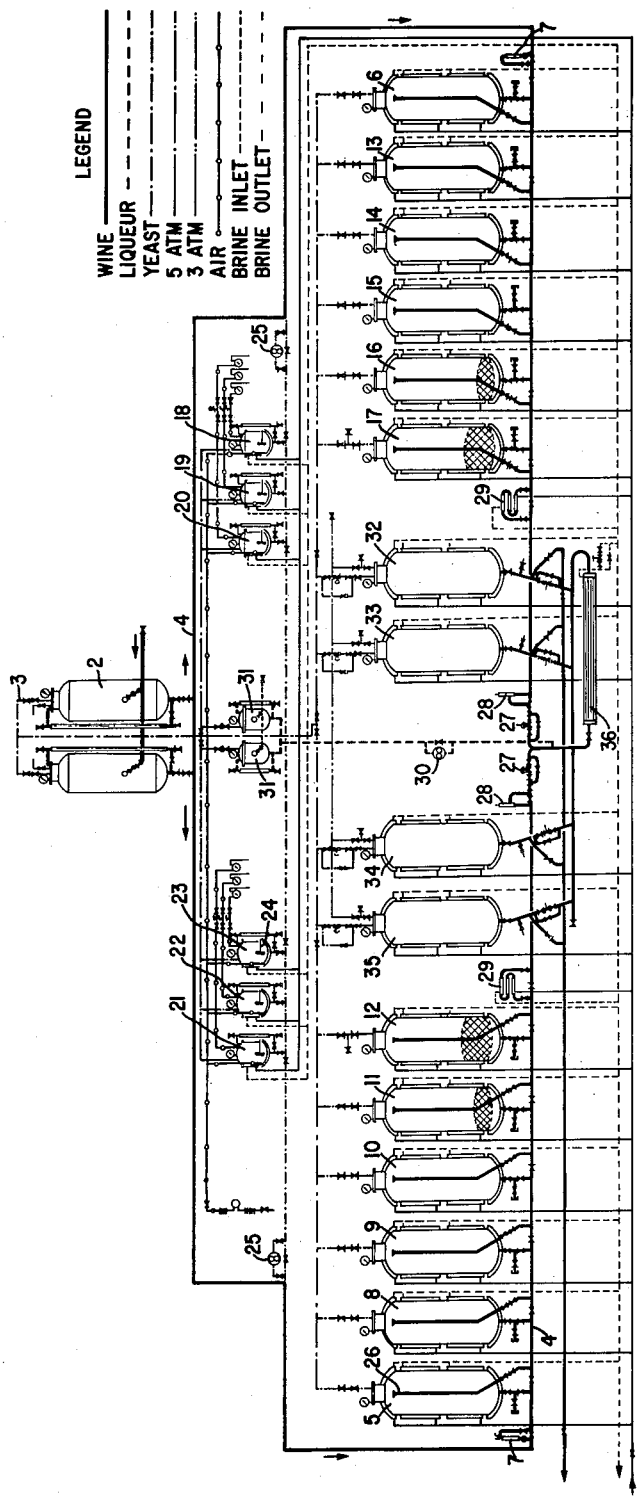

3,062,656
METHOD OF CHAMPAGNIZING WINE IN A CONTINUOUS STREAM AND INSTALLATION FOR SAME
Georgui Gerasimovich Agabalianz and Artemi Artemievich Merzhanian, both of Novokuznechnaia ul. 12, Apt. 12, Krasnodar, and Serguey Alexeevich Broosilovski, prospekt Mira 74, Apt. 12, Moscow, all of Union of Soviet Socialist Republics
Filed Dec. 10, 1959, Ser. No. 7,962
4 Claims. (Cl. 99—41)

This invention relates to a method of champagnizing wine in a continuous stream and installation for same.

The object of this invention is a method of champagnizing wines in a continuous stream, and an installation for realizing the said method, employing, during the said champagnization, a constant pressure in series connected tanks of a fermenting apparatus, and cooling the wine on its discharge from the fermenting apparatus to a temperature down to minus 5° C.

The already known method of champagnizing wine in a continuous stream by employing constant pressure in series-connected fermenting apparatus tanks during the champagnization, and cooling the wine on its discharge to minus 5° C., is accompanied by a partial saturation of the wine by carbondioxide supplied from the outside (from tanks), the said carbondioxide usually containing oxygen and other undesirable admixtures.

This saturation of the wine with gases from the space above the wine lowers the quality of the champagne.

In the described method of champagnizing wines to eliminate this shortcoming and thus improve the quality of the champagned wine, the surfaces of the fermenting mixture in the discharge tank and the wine in the receiving tank are covered with a layer of deodorized Vaseline or paraffin oil, from 0.5 to 1.5 mm. thick.

In the fermenting installation, the process is conducted at a decreasing temperature 13–14° C. in the first tank and 9–10° C. in the last; at the same time, during the champagnizing process, liquid yeast is added continuously in definite doses to the fermenting mixture at its inlet into the first fermenting tank; liqueur is added continuously in definite doses to the stream of champagnized wine at its discharge from the last fermenting tank; and before finally cooling the wine it is cooled preliminarily to a temperature of 0° to +2° C. just before the liqueur is added.

The accompanying drawing gives a view of the installation for realizing the above method of champagnizing wine in a continuous stream.

The installation for realizing this method is executed as two coupled fermenting batteries and consists of a loading section comprising two vertical pressure tanks 1 and 2, with spherical end plates. Each pressure tank is equipped with a pressure gauge, graduated wine gauge and a stationary pipe line for delivering of each successive portion of the fermenting mixture. Pressure tanks 1 and 2 are connected through the covers of the mouth of the upper end plates to common gas pipe 3 of the installation. Their lower end plates are connected in such a manner that the fermenting mixture from any of the two pressure tanks can be discharged simultaneously along stationary wine pipe-line 4 into the first fermenting tanks 5 and 6 of the two fermenting batteries.

After filling the pressure tanks 1 and 2 with the fermenting mixture, a thin continuous film of purified deodorized paraffin or Vaseline oil from 0.5 to 1.5 mm. thick is applied to the surface of the wine, which sharply reduces the rate of absorption of carbondioxide gas and oxygen by the wine.

After one of the pressure tanks 1 or 2 is empty, which occurs approximately every 38 hours, the installation is automatically switched over for feeding from the other pressure tank. The carbon dioxide pressure in the first pressure tank is reduced to barometric pressure and the tank is refilled with a batch of fermenting mixture. This combination of two pressure tanks to form a single common unit creates better maneuvering conditions for recharging any one of the two operating fermenting batteries, and makes it possible to dispense with two pressure tanks in the coupled installation, inasmuch as two independently operating installations would otherwise require four pressure tanks.

From the next pressure tank 1 or 2, the wine flows through flowmeter-rotameters 7 into continuous action fermenting apparatuses (5, 8–12 and 6, 13–17) in which the champagnizing process is effected. Before the wine enters the first tanks of the fermenting apparatuses 5, 6 a solution of pure yeast is introduced into the stream.

The yeast solution is prepared continuously in a special yeast breeding apparatus. The yeast breeding apparatus of the coupled installation consists of six tanks 18, 19, 20 and 21, 22 and 23 connected to form two batteries of three tanks each. Each tank has a useful capacity of up to 30 dekalitres, and a jacket-space for regulating the temperature of the medium. Each three tank battery share a common drive for blade mixers 24. Tanks 18—23 are equipped with graduated wine gauges, pressure gauges, and bubbling tubes for blowing air continuously through the medium. The tops of the yeast tanks are connected by pipe lines to the gas system of the installation; their bottoms—to the stationary yeast pipelines, along which the yeast solution flows simultaneously into two gear pumps 25, and thence—into the stationary wine pipelines 4 together with the fermenting mixture before entering the initial fermenting tanks 5 and 6.

The yeast apparatus operates as follows: During the starting-up period, mother cultures of pure-race yeast are prepared in the six tanks of the yeast apparatus in the usual manner as to ensure the accumulation of no less than 30,000,000 yeast cells per cc. of medium in at least one of the tanks by the time the flow is started. In order to intensify propagation of the yeast cells, the medium in all the six yeast tanks is continuously agitated and bubbled with filtered air. At the same time the flow of the wine in the fermenting apparatus is started, the first yeast tank is connected to the apparatus, after building up in it a carbon dioxide pressure equal to the working pressure in the entire system. Gear pumps 25 are then switched on, thereby ensuring continuous and uniform delivery of the yeast solution into piping 4 containing the fermenting mixture, before the latter enters the first fermenting tanks 5 and 6 of the two batteries. Bubbling the medium with air is discontinued at the moment the next yeast tank is connected to the fermenting apparatuses, but agitation goes on to ensure uniform distribution of the yeast cells through the yeast solution. A yeast tank is connected to the installation every 60 hours, during which period the yeast cells are reproduced under conditions most favourable for their propagation.

On entering the fermenting apparatus, the fermenting mixture, together with the yeast introduced into it, passes consecutively through each of the fermenting tanks 5, 6, 8—17, flowing in each tank from bottom upwards. A constant rate of flow corresponding to a flow of 7–7.5 dekaliters per hour of wine is maintained in the apparatus.

Each fermenting apparatus of the coupled installation consists of six fermenting tanks 5, 8–12 and 6, 13–17, each of 475–500 dekaliters capacity. The tanks of each fermenting battery are connected to each other by wine pipelines 4 in such a manner, that the liquid enters them from the bottom and is discharge from the top through overflow pipes 26 located along the vertical axis of each fermenting tank. There is no free surface contact between the wine and the carbon dioxide in the tank, as the level of the wine being champagnized is above the neck of the tanks, in the stationary gas line above the valves by which all of the fermenting tanks are disconnected from the gas system after the flow has been started.

The fermenting mixture, flowing through all six fermenting tanks of the two independent fermenting batteries, mixes with the continuously introduced yeast and is champagnized. In the last two tanks 11—12 and 16—17 of each fermenting battery the wine being champagnized passes through a layer of special polyethylene ring caps, the surface of which traps a portion of the yeast which in the course of time undergoes natural autolysis. In these tanks, the champagne is enriched by the products of autolysis of the yeast cells, thereby improving its flavour and bouquet. Moreover, the increased concentration of yeast in the last tanks of the fermenting apparatus makes it possible to conduct the champagnizing process at lower temperatures and, therefore, to obtain a champagne possessing improved sparkling and foaming properties.

The output (flow rate) of each fermenting battery is regulated and controlled by automatic valves 27 and electric rotameters 28 installed on the outlet of the champagnized wine, through heat exchangers 29 which are directly connected to the last tank of the fermenting battery. On being discharged from rotameters 28, the counter-streams of the wine, previously cooled to a temperature of approximately 0° to +2° C., unite into a single stream. Cask liqueur is added to the united stream from the liqueur tank 31 connected to the installation with the aid of gear pump 30.

The liqueur dosing unit of the coupled installation consists of two tanks 31, each of 35 dekalitres capacity, located slightly above the level of the inspection holes of receiving tanks 32—33 and 34—35, which are fitted with graduated wine gauges, pressure gauges and stationary gas and liqueur pipe lines, by which any required liqueur tank can be connected to the installation. Receiving tanks 32—33 and 34—35 are interblocked in pairs and can be automatically put into operation after any of them has been filled.

After preliminary cooling and introduction of the liqueur, the champagne is cooled quickly to minus 5° C. in counter-current brine heat exchanger 36.

From the cooling unit, the champagne flows into one of the four thermos-tanks of 475 dekalitres capacity, in which it is held at the above mentioned temperature (i.e. low temperature treated). In the receiving thermos-tanks as in the pressure tanks, the surface of the wine is covered with a thin layer of paraffin or Vaseline oil to prevent it from absorbing gases from the space above the wine while the receiving thermos-tanks are being filled and the champagne is being held at the above mentioned low temperature.

After low-temperature treatment, the champagne is filtered and bottled in the usual way adopted at tank champagnization plants.

We claim:
1. A method of champagnizing wine comprising feeding the wine in a continuous stream at constant pressure through a series of connected hermetically sealed fermentation spaces, feeding liquid yeast continuously in predetermined amounts into the first space, conducting the fermentation at a decreasing temperature of 13°–14° C. in the first space to 9°–10° C. in the last space, covering the wine in said spaces with a layer of deodorized material selected from the group consisting of Vaseline and paraffin oil 0.5–1.5 mm. thick to reduce absorption of carbon dioxide gas and oxygen by the wine, adding liqueur in predetermined amounts continuously to the stream of the champagnized wine on its discharge from the last fermenting space, cooling the wine to a temperature of from 0° to +2° C. just before adding the liqueur, and finally chilling the wine on its discharge to −5° C.

2. The method of champagnizing wines in a series of connected hermetically sealed fermentation spaces comprising feeding a continuous stream of wine at constant pressure through the said spaces, covering the wine in said spaces with a layer of deodorized material selected from the group consisting of Vaseline and paraffin oil and continuously feeding fresh yeast in predetermined amounts into the stream of wine in the first space and discharging the champagnized wine from the last of the series of said spaces, and cooling the wine to −5° C. on its discharge.

3. The method of claim 2, in which the wine is subjected to yeast autolysis products generated in the last of the series of spaces.

4. The method of claim 2, in which liqueur is fed into the discharged champagne from the last fermentation space, cooling the wine to a temperature of from 0° to +2° C. just before adding the liqueur, and finally chilling the wine on its discharge to −5° C.

References Cited in the file of this patent

UNITED STATES PATENTS

| 704,533 | Garrett | July 15, 1902 |
| 1,043,361 | Romer | Nov. 5, 1912 |

FOREIGN PATENTS

| 776,352 | France | July 23, 1934 |